Jan. 9, 1934.                W. H. BOSWORTH                1,942,798
                              LOADING MACHINE
                           Filed Aug. 9, 1932           2 Sheets-Sheet 1
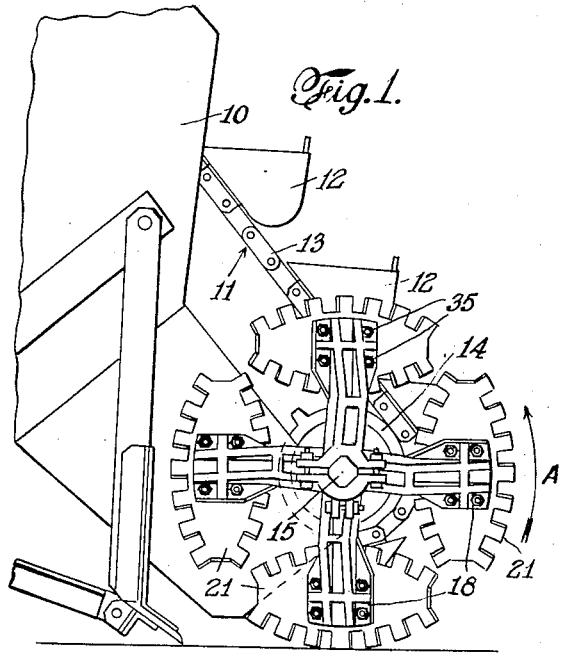
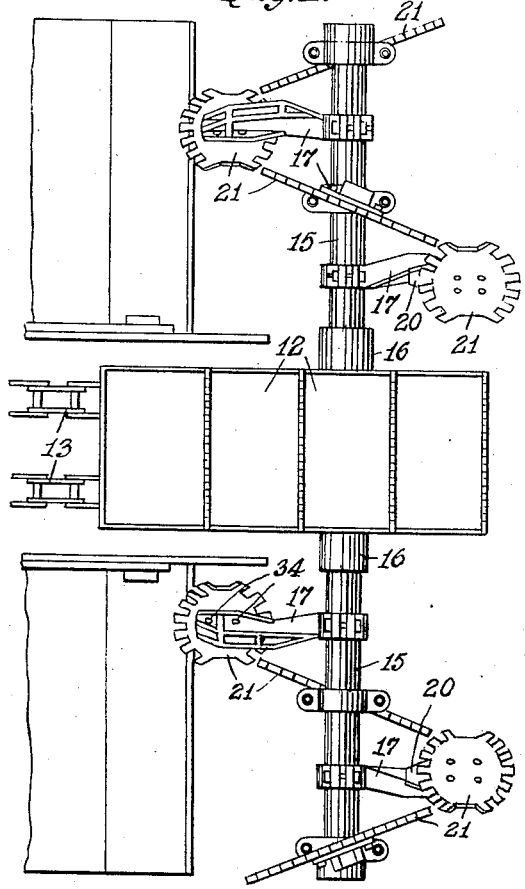
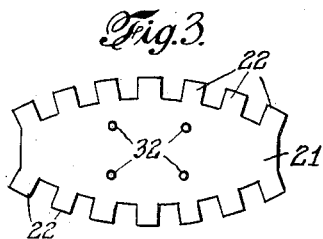
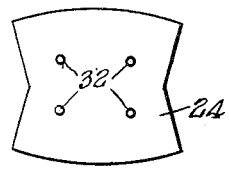
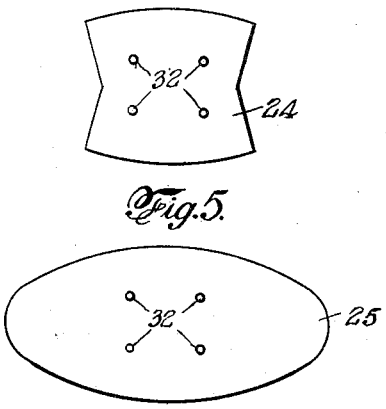
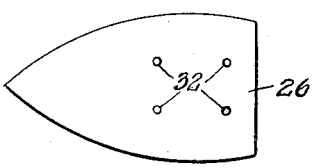
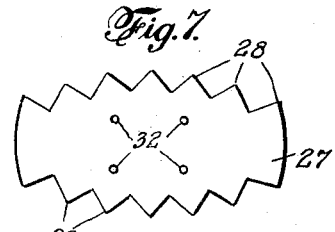
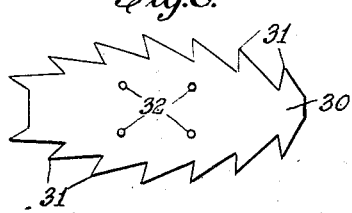
INVENTOR
William H. Bosworth
BY
William, Rich & Morse
ATTORNEYS Jan. 9, 1934.    W. H. BOSWORTH    1,942,798
LOADING MACHINE
Filed Aug. 9, 1932    2 Sheets-Sheet 2
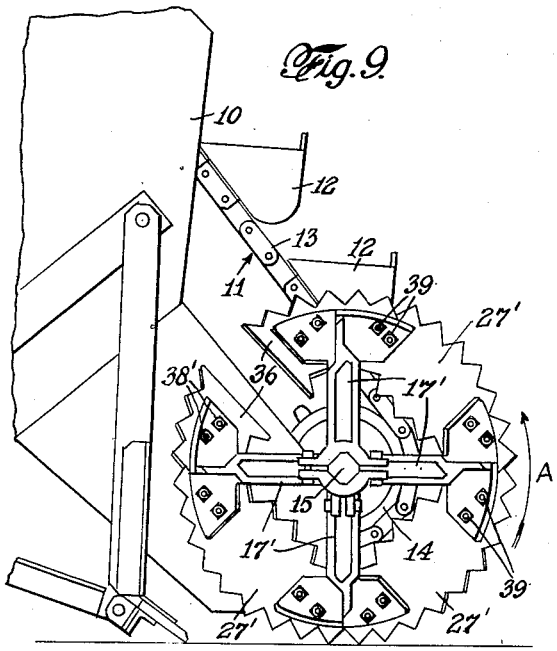
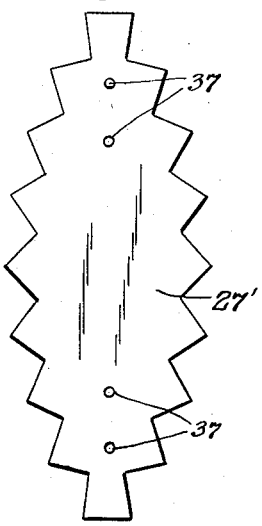
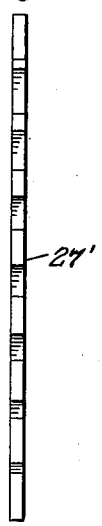
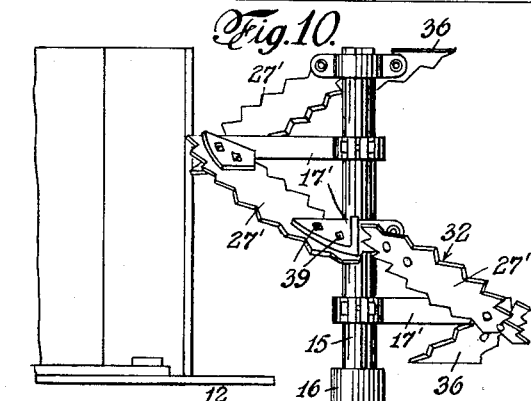
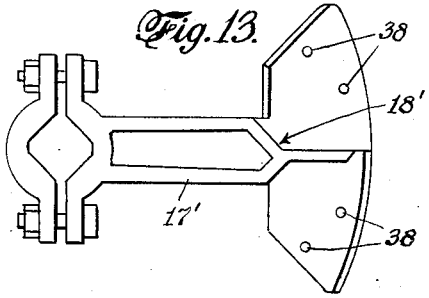
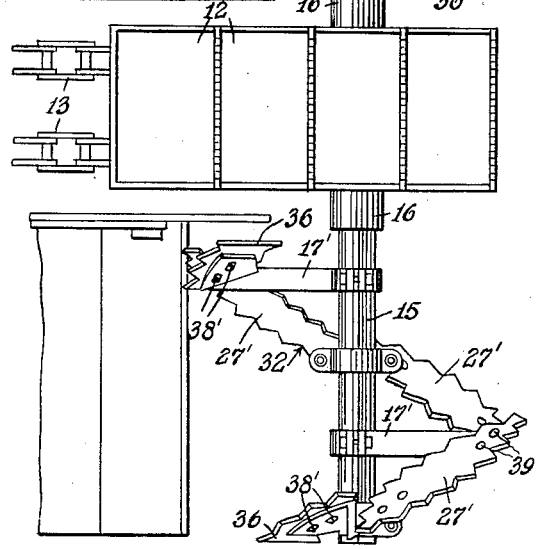

Patented Jan. 9, 1934

1,942,798

UNITED STATES PATENT OFFICE 1,942,798

LOADING MACHINE

William H. Bosworth, Yonkers, N. Y., assignor to George Haiss Manufacturing Co. Inc., New York, N. Y., a corporation of New York Application August 9, 1932. Serial No. 628,019

2 Claims. (Cl. 198—9)

This invention relates to loading machines of the type characterized by an endless bucket conveyor, at the pick-up end of which is provided a transverse shaft which projects beyond each side of the conveyor and is there provided with material-propelling elements, either blades or spiral ribbons, which so act on the material to be loaded as to cause it to move toward and into the path of the conveyor where it is picked up and elevated by the buckets thereof as the machine is moved under its own power toward and into the material to be loaded.

Heretofore the material-propelling elements, above-mentioned, have been especially designed as "rights" and "lefts", and for that reason a serious objection has been raised from a "spare parts" standpoint, which objection has been justified on the ground that a contractor, for example, using one of the machines as a part of his equipment is required to keep on hand an excessive number of material-propelling elements in order to meet any emergency arising from either a "right" or a "left" breakdown. Moreover, the distributors of spare parts have voiced a similar objection in that they have been required to stock both right-hand and left-hand material-propelling elements in order to be able to meet any demand that may arise in case of an emergency.

Aside from the above, material-propelling elements of the character hereinbefore employed have been objectionable from an economic or a cost replacement standpoint. Such objection has been warranted, but has remained unsatisfied because of the fact that the material-propelling elements have been constructed as fixed units heretofore with the result that it has been impossible to replace worn parts, such as the material-engaging portions, without having to discard the remaining and relatively expensive unit-parts to make way for new or substitute material-propelling elements.

An object of the present invention is to relieve the above-stated objects, and at the same time broaden the range of efficiency of machines of the above generally described character, and to these and other ends the invention contemplates a feeding mechanism characterized by a shaft, projecting beyond the conveyor at opposite sides thereof and provided with a plurality of blade-carrying arms, having oppositely inclined faces adapted to detachably receive a plurality of blades which, when connected to said arms, serve to move the material into the path of the conveyor, the face of each of said arms bearing such a structural relation to all of such blades that any one of said blades is adapted to be connected to any one of said arms in an operative position.

The invention further contemplates such a structural relation between the face of any arm and all of said blades that any one of said blades is adapted to be connected to any one of said arms in a plurality of operative positions, each of said blades having a plurality of similarly shaped working margins, the number of which margins on any blade determines the number of possible operative positions that it may assume on any one of said arms.

Other objects and advantages of the invention will become apparent from the following description, taken in connection with the accompanying drawings—in which Fig. 1 is a side elevation of the pick-up end of a wagon loader embodying the invention; Fig. 2 is a plan view of the parts shown in Fig. 1; Fig. 3 is a face view of one of the several material-propelling blades shown in Figs. 1 and 2; Figs. 4 to 8 inclusive are views similar to Fig. 3 and showing modified forms of material-propelling blades; Fig. 9 is a view similar to Fig. 1 and showing a plurality of material-propelling blades arranged to simulate a spiral; Fig. 10 is a plan view of the parts shown in Fig. 9; Fig. 11 is a face view of one of the several material-propelling blades shown in Figs. 9 and 10; Fig. 12 is an edge view of the blade of Fig. 11; Fig. 13 is a side elevation of one of the blade-supporting arms appearing in Figs. 9 and 10; and Fig. 14 is an end view of the arm as viewed from the right in Fig. 13.

Loaders of the type above mentioned include a frame 10 adjustably mounted on a traction-device (not shown) by which the machine may be propelled from place to place and crowded at slow speed toward and into the material to be loaded, there being a power unit such as an internal combustion engine (not shown) employed as a driving means for the traction-device as well as for the conveyor 11. The conveyor includes a plurality of buckets 12, carried by a pair of chains 13 passing over sprockets of which the lower sprockets 14 only are shown, these lower sprockets being secured to a shaft 15 intermediate the ends thereof, and the shaft being journalled at 16 in the lower end of the frame 10 and extending transversely of the machine. It will be understood that the driving connection between the power unit and the conveyor chains 13, which drive the shaft 15, is such that this shaft is rotated in the direction of the arrow A in Figs. 1 and 9.

Referring to Figs. 1 and 2, wherein the present invention is shown embodied in a feeding mechanism of the paddle-like type, it will be observed that the shaft 15, which extends beyond the conveyor at opposite sides thereof, is provided with a plurality of sets of blade-carrying arms 17, which are spaced laterally from each other and are so secured to the shaft as to rotate therewith. These arms 17 are provided with blade-carrying portions 18, the flat blade-receiving faces 20 of which, on opposite sides of the conveyor, are oppositely inclined or pitched.

In order that the machine may be operated at maximum efficiency in the handling of various kinds of material, I so construct the arms 17 as to enable various types of material-propelling blades to be detachably connected thereto in full complement, and by way of illustration I have herein shown several forms or different types of such blades, all of which are flat so that they will conform to the plane of the blade-receiving faces 20 and all of which are so shaped that they respectively present a plurality of identical working margins.

The form of blade 21, shown in Figs. 1, 2 and 3, is characterized by the fact that its working margins are provided with a series of teeth 22, the outer ends of which are relatively blunt. In Fig. 4, the form of blade 24 shown therein is characterized by the fact that its working margins are plain and by the fact that it is substantially V-shaped at its opposite ends. The form of blade 25, appearing in Fig. 5 is substantially elliptical. In Fig. 6 the blade 26 is characterized by the fact that it is tapered toward one end so as to present a relatively sharp entering point. The blade 27 of Fig. 7 is substantially identical with the blade 21 except for the fact that its teeth 28 are pointed. In Fig. 8, the blade 30 is substantially identical with the blade 27 except for the fact that its teeth 31 are pitched or inclined forwardly and present sharp or chisel-like points.

Each of the foregoing material-handling blades is provided with a group of bolt-receiving openings 32. The openings in any one blade are spaced in accordance with the openings of each of the other blades and also in accordance with bolt-receiving openings 34 provided in the blade-receiving portions 18 of the respective arms 17. By adhering to such spacing of the openings 32 and 34, it follows that any blade may be detachably connected to any blade-carrying arm by the aid of blade-retaining bolts 35 adapted to fit the openings 32 and 34, and this may be done without regard to right-hand or left-hand blades, because of the fact that the blade-receiving faces 20 and opposite sides of the respective blades present plane surfaces. By reason of the symmetrical formation of the blades and the structural relation that they bear to the blade-carrying arms, it is possible to reverse any blade so that it will present a new working surface or margin as may be occasioned by wear to which the blades are subjected in operation, each of such blades being reversible with respect to any and all of the blade-carrying arms and the number of operative positions of any one blade being in accord with and determined by the number of working margins with which it is provided.

Referring to Figs. 9 and 10, wherein the invention is shown embodied in a worm-like type of feeding mechanism, it will be observed that the blade-carrying portions 18' of the blade-carrying arms 17' are each provided with a pair of flat blade-receiving faces 20' which, on opposite sides of the conveyor, are oppositely inclined or pitched.

As to the material-propelling blades, various forms may be employed to enable the maximum efficiency of the machine to be realized, as previously described, there being shown in Figs. 9, 10, 11 and 12 one form of blade 27' which corresponds to and is substantially identical with the blade 27, previously described, except that it is of such length as to enable it to be connected at opposite ends to adjacent blade-carrying arms 17'.

As shown in Figs. 9 and 10, a plurality of the blades 27' are so arranged as to present a spiral-like ribbon 32 at each side of the conveyor, each ribbon including at its opposite ends a blade section or half blade 36.

Inasmuch as the blades 27' are flat, are identical with each other, and are provided with similarly located bolt-receiving openings 37, which are spaced according to the uniformly spaced bolt-receiving openings 38 of the blade-carrying arms 17', it follows that the blades are interchangeable with each other without regard to "rights" and "lefts". It also follows that these blades, due to the fact that their opposite working margins are identical, may be reversed to present a new working margin when conditions of wear prompt such reversal, it being necessary to merely remove the blade-retaining bolts 39 by which the blades are held in one or the other of their operative positions. As to the blade sections or half blades 36, they are likewise reversible and interchangeable with each other, inasmuch as one is a duplicate of another, and since they are all flat and are provided with bolt-receiving openings which are spaced according to the bolt-receiving openings of the blade-carrying arms so as to enable them to receive the necessary blade-retaining bolts 38' by which they are secured in position at the opposite ends of the respective spiral-like ribbons 32.

As to the operation of the machines herein shown, it will be understood that as the shaft 15 is rotated in the direction of the arrow A in Figs. 1 and 9, the material to be loaded is moved toward the endless conveyor from each side thereof and into the path of the conveyor buckets by which it is collected and elevated. Also, it will be understood that the type of material-propelling blades to be employed so that the machine may operate at maximum efficiency is determined by the nature of the material to be handled as, for example, blades of the character shown in Fig. 3 may be employed to advantage in the handling of top soil, molding sand, and like materials. On the other hand, if such materials as coal, coke and the like are to be handled, the type of blade shown in Fig. 5 may be used to advantage, and so on, any one group of blades being easily substituted—as occasion may require—for any other group of blades, without regard to "right" and "lefts", and all of the blades being reversible so as to utilize all of their working margins, and thus prolong the period of usefulness as far as possible.

Aside from the forms of the invention herein shown and described, it will be understood that various other modifications may be resorted to without departing from the spirit of the invention or the scope of the following claims.

What is claimed is:

1. In a loading machine of the endless conveyor type, a feeding mechanism adapted for use at the pick-up end of the conveyor and comprising a shaft projecting beyond the conveyor at opposite sides thereof and adapted for rotation simultaneously with the operation of the conveyor, a plurality of blade-carrying arms connected to said shaft at opposite sides of said conveyor in a spaced relation to each other and having oppositely inclined faces, a plurality of blades adapted for connection with said arms in a face-to-face relation to said faces, and which when so connected serve to move the material into the path of the conveyor from opposite sides thereof, each of said arms bearing such a structural relation to all of said blades that any one of said blades is adapted to be received by any one of said faces and to be there secured in an operative position, and means for detachably connecting said blades to said arms and for holding the same in a face-to-face relation to said faces.

2. In a loading machine of the endless conveyor type, a feeding mechanism adapted for use at the pick-up end of the conveyor and comprising a shaft projecting beyond the conveyor at opposite sides thereof and adapted for rotation simultaneously with the operation of the conveyor, a plurality of blade-carrying arms connected to said shaft at opposite sides of said conveyor in a spaced relation to each other and having oppositely inclined faces, a plurality of blades, each adapted for connection with adjacent arms in a face-to-face relation to said faces, which blades when so connected constitute spiral-like ribbons, one at each side of said conveyor serving to move the material into the path of the conveyor from opposite sides thereof, each of said arms bearing such a structural relation to all of said blades that any one of said blades is adapted to be received by the faces of any adjacent arms and to be there secured in an operative position, and means for detachably connecting said blades to said arms and for holding the same in a face-to-face relation to said faces.

WILLIAM H. BOSWORTH.